Patented Sept. 7, 1954

2,688,642

UNITED STATES PATENT OFFICE 2,688,642

PROCESS FOR THE MANUFACTURE OF
DICHLOROPROPENES

Alexander M. Partansky, Antioch, Calif., assignor
to The Dow Chemical Company, Midland,
Mich., a corporation of Delaware No Drawing. Application December 1, 1948,
Serial No. 62,969

4 Claims. (Cl. 260—654)

This invention relates to methods for the chlorination of propylene at elevated temperatures to make polychlorinated derivatives thereof. It is particularly concerned with methods in which the reaction product contains a substantial proportion of dichloropropenes, and more especially of 1,3-dichloropropenes.

The dichloropropenes have attained economic importance as fumigants for the treatment of soils to combat nematodes, wire worms and other plant pests which cause damage to commercial crops. Of the various isomers, the 1,3-dichloropropenes have been found to be the most effective as soil fumigants. The art has been concerned with the development of manufacturing processes capable of producing good yields of these compounds at an economically favorable cost.

The direct approach to the problem has been by way of chlorination of propylene at elevated temperatures whereat chlorination by substitution takes place in preference to chlorination by addition. It is well known that the chlorination of gaseous lower aliphatic hydrocarbons, both saturated and unsaturated, involves highly exothermic reactions in which the heat of reaction is so great that it can raise the temperature of the reacting mixture to the point where combustion occurs, accompanied by decomposition and formation of carbon, unless measures are taken to control the temperature. Numerous expedients have been proposed in the art for absorbing the excess heat liberated in the reaction so as to control the temperature thereof and prevent carbonization. One such expedient is to employ a large excess of the hydrocarbon in the reaction mixture, the excess acting as a diluent to absorb heat of reaction. Such procedure has the limitation, however, that the chlorinated reaction product consists largely of the monochlorinated derivatives. Another expedient is to employ an inert diluent gas or vapor for absorbing heat, but the selection of a suitable inert diluent is not a mere matter of choice in many cases. Although the diluent may not itself enter into a chemical reaction with the other materials present, it may in some cases unfavorably affect the desired reaction or may direct the reaction in an unpredictable way toward the formation of undesired products.

In the chlorination of propylene it is known that, in the absence of a diluent, at least two, and preferably more, volumes of propylene per volume of chlorine must be used to prevent excessive temperature rise of the reacting mixture, with accompanying decomposition and carbon formation. By such procedure the products of the reaction are mainly monochloro-derivatives, whereas for the preparation of dichloropropenes in good yield a molecular excess of chlorine relative to propylene is required. It has been customary, therefore, to carry out the preparation of dichloropropenes by a stepwise procedure rather than in a single chlorination step.

I have now found that a high yield of dichloropropenes may be obtained by a process involving a single chlorination step in which a volumetric excess of chlorine to propylene is employed, when the operation is carried out under the particular conditions hereinafter described. The invention has various objects, among which are the following: (1) to provide a process by which dichloropropenes, and particularly the 1,3-dichloropropenes (cis and trans), may be formed from propylene as a principal product of a single chlorination step; (2) to enable the chlorination to be carried out with a volumetric excess of chlorine to propylene without substantial formation of carbon or tars; (3) to carry out the reaction without recourse to the use of a chlorination catalyst and thus be independent of loss of catalyst activity and necessity to replace the catalyst from time to time; (4) to obtain a high degree of conversion of the reacting gases; (5) to repress the formation of saturated chlorinated propanes by chlorine addition while promoting the formation of chlorinated propenes by chlorine substitution. A further advantage of the invention is that the process may be applied for the chlorination of monochloropropenes, and mixtures thereof with propylene, to convert the same to dichloropropenes.

In my investigations I found that the problem of control of tar formation in the chlorination of propylene and monochloropropenes is to a great degree separate from that of preventing decomposition of the reaction materials and carbon formation. For prevention of carbon formation it is generally necessary only to control the reaction by use of a sufficient volume of diluent so that the temperature does not materially exceed about 700° C. For the chlorination of gaseous aliphatic hydrocarbons the art has suggested a variety of inert diluents to control temperature, examples of which are nitrogen and water vapor. In the chlorination of an unsaturated hydrocarbon, and specifically propylene, however, there is a separate problem of controlling or preventing tar formation. The unsaturated chloropropenes, which are formed by the reactions of chlorine and propylene at elevated temperatures, are capable of polymerizing or condensing to form materials of high molecular weight, which in turn may undergo partial decomposition and carbonization, resulting in the production of dark colored viscous materials collectively designated as tars. Such tars, when formed, give rise to difficulties due to deposits in the reactor, coolers, condensers, pipe lines, etc., causing stoppages and generally interfering with the smooth operation of the process. The tars may be formed at temperatures below the decomposition temperature of the gaseous reactants, and in fact within the temperature range favorable for the desired reaction. Inert diluents which may be used to control the temperature of the reaction do not in all cases prevent or suppress tar formation at the reaction temperature.

For example, I have found that nitrogen, a diluent that has been frequently proposed for chlorination reactions, does not prevent tar formation in the thermal chlorination of propylene. In attempting to chlorinate propylene in the temperature range of 450° to 500° C. with a volumetric excess of chlorine and with sufficient nitrogen as diluent to control the temperature, tar formation was so great that in from 1 to 4 hours it was necessary to shut down the operation because of stoppages caused by tar, and the conversion of propylene to the desired products was uneconomically low, due in part to losses from tar formation. On the other hand, when water vapor was used as diluent in the same temperature range no such trouble was experienced and there was no visible evidence of tar formation. I found, however, that some tar was formed if the reaction temperature was allowed to exceed 550° C. for more than a short time.

The invention, then, is based upon the chlorination of propylene with a molecular excess of chlorine in the presence of water vapor as diluent under certain conditions, as hereinafter described, for producing a high yield of dichloropropenes without substantial formation of tar.

While theoretically 2 mols of chlorine are required to convert 1 mol of propylene to dichloropropene, the use of the full chemical equivalent of chlorine leads to formation of substantial amounts of trichloro-derivatives of propylene at the temperatures normally required for direct thermal chlorination of propylene. I have found that the best yields of dichloropropenes are obtained by using from 1.3 to 1.9 mols $Cl_2$ per mol $C_3H_6$ in my process. Similarly, in chlorinating allyl chloride or other monochloropropene, the ratio of $Cl_2$ to $C_3H_5Cl$ is less by 1 than the above ratio, hence is 0.3 to 0.9. When chlorinating mixtures of propylene and monochloropropene, the amount of chlorine used is adjusted according to the relative proportions of the components in the mixture. Expressed as a formula, mole $Cl_2 = x \cdot$ mols $C_3H_6 + (x-1)$ mols $C_3H_5Cl$ where $x$ has a value from 1.3 to 1.9

The chlorination of propylene according to the invention is carried out at temperatures in the range of 400° to 550° C., preferably between 400° and 500° C., within which chlorination by substitution predominates over chlorination by addition under specified reaction conditions. The temperature of the reaction, wherever referred to, is the maximum existing in the reactor, as determined by a temperature traverse of the same.

Time is an essential factor in securing the highest yield of chlorinated unsaturates in the process. If the flow rate of gases in the reactor is too high, saturated chlorinated derivatives are produced instead of unsaturated derivatives to a material extent. This appears to be due to the incompleteness of the chlorination in the hot reaction zone, leaving unreacted chlorine in the exit gases, which then chlorinates the unsaturates present by addition at the lower temperatures in the condensing system to form chlorinated saturated derivatives. The gas flow rate should be such that an average residence time of at least one second in the reactor is provided. From 1 to 3 seconds residence time is the preferred condition. Reaction times in excess of 3 seconds may be employed, but apparently with little or no further gain in yield of chlorinated unsaturates.

It is advantageous to preheat the feed gases at the time of mixing, so that the mixed gases will be admitted to the reactor at a temperature not far below the desired reaction temperature. In general the mixed feed gases are preheated to a temperature between 100° and 400° C. just prior to introducing them into the reactor. Such preheating may be done in various ways. Either the propylene or the diluent (steam) may be preheated, or both of them, prior to mixing with chlorine, sufficient superheat being added to the preheated gas to raise the temperature of the resultant mixture to the desired degree. For example, chlorine and propylene at normal temperature may be mixed with steam superheated sufficiently to heat the mixture to the desired temperature. A portion of the preheat may be applied to the propylene before mixing the gases. Chlorine and propylene may be premixed before mixing with steam, or both gases may be mixed separately with the steam.

The volume of steam required as diluent to control temperature of the reaction will vary with the thermal balance of the process, including the amount of preheat of the feed gases, and the temperature to be maintained in the process. It will also depend upon the thermal characteristics of the reactor and radiation losses from the same. For any particular reactor an empirical factor may be applied to the calculated volume of steam required for absorbing the excess heat of reaction. In any case the volume of steam to be used is that which is sufficient to maintain the reaction temperature within the desired range. In general practice, it may be from 50 to 80 per cent of the combined volume of propylene and chlorine.

In carrying out the process, chlorine and propylene may be mixed at normal temperature in the proportion of 1.3 to 1.8 volumes of chlorine per volume of propylene. The mixed gases are then introduced into a current of steam superheated to a temperature sufficient to produce in the resulting mixture a temperature between 100° and 400° C., preferably between 300° and 400° C. The proportion of steam used is that which is sufficient to maintain the temperature of the ensuing reaction in the range of 400° to 550° C. The preheated gas mixture is immediately passed into a reactor consisting preferably of an open chamber of such volume relative to the flow rate of the gases that a residence time of at least 1 second is provided in the reaction zone. No catalyst is used. The reaction is initiated spontaneously and practically instantaneously in the reactor, which is maintained in the operating temperature range of 400° to 550° C. by the heat of reaction. The exit gases from the reactor pass to a condenser where the less volatile components are liquefied and drawn off. The uncondensed gases from the first condenser pass to a water scrubber for absorption of hydrogen chloride and condensation of steam, from which is withdrawn an aqueous hydrochloric acid solution. The residual gases are passed through a dryer, where they are contacted with a drying agent to absorb moisture therefrom, and finally to a refrigerated condenser for liquefying the more volatile fractions. The final vent gas comprises chiefly unreacted propylene, which may be returned to the process. The condensates, either combined or separately, are fractionally distilled to separate the components.

A typical reaction product will contain about 20 to 40 per cent by weight of monochloro-derivatives of propylene, chiefly allyl chloride; about 40 to 45 per cent of dichloro-derivatives, from 75 to 85 per cent of which are unsaturated, 1,3-dichloropropene being the principal constituent; and about 20 to 30 per cent of trichloro-derivatives and higher. The relative proportions of monochloro-derivatives and trichloro-derivatives will vary with the ratio of chlorine to propylene, within the range stated, which is employed in the feed. The lower the ratio of chlorine to propylene, the higher is the proportion of monochloro-derivatives and the lower the proportion of trichloro-derivatives in the product, and vice versa. The proportion of dichloro-derivatives in the product, however, does not vary greatly within the specified ranges of conditions.

Similar results are obtained when monochloropropenes, or mixtures thereof with propylene, are used for the feed, the ratio of chlorine to monochloropropene in the feed then being in the range of 0.3 to 0.9 mol of chlorine per mol of monochloropropene, in accordance with the formula given above. The art has heretofore considered the monochloropropenes, such as allyl chloride, to be difficult to chlorinate by a thermal process for preparation of higher chlorinated unsaturates, due to the readiness with which it or its conversion products decompose to form carbon. By my process I have found that allyl chloride, for instance, can be readily chlorinated by substitution to give a high yield of dichloropropenes, principally 1,3-dichloropropene. The yield so obtained is in fact somewhat higher than when propylene is chlorinated.

The following examples illustrate various ways in which the principle of the invention may be applied, but are not to be regarded as limiting the same. In the examples the reactor temperatures shown are the maximum temperature in the reactor, occurring at the "hot spot." The "residence time" is an average calculated from the gas flow rate and reactor volume, assuming that the temperature throughout the reactor is at the maximum. Actually this calculated value is slightly higher than the true value, due to variations of temperature within the reactor.

EXAMPLE 1

This example shows the difference in result obtained by chlorinating propylene according to the invention using steam as diluent, and under similar conditions except that nitrogen is used as diluent. Chlorine and propylene were mixed at room temperature in the molar proportions $Cl_2/C_3H_6$ of approximately 1.5/1, and the mixed gases were in turn mixed with the preheated diluent in amount and at a temperature sufficient to form a preheated gas mixture having a temperature of about 300° C. The preheated mixture was immediately passed into a reactor of capacity to provide a residence time of about 2 seconds. The exit gases from the reactor were passed to a condenser and scrubber to recover as liquid the chlorinated hydrocarbon product. Operating details and a material balance of recovered products are shown in the following table in which the chlorinated hydrocarbon product is referred to in customary manner as RCl:

*Table I*

| Reactants, mols: | | |
|---|---|---|
| $C_3H_6$ | 40.9 | 41 |
| $Cl_2$ | 59.1 | 59 |
| Diluent, mols: | | |
| $N_2$ | 70.0 | |
| $H_2O$ | | 68 |
| Temperature, °C.: | | |
| Preheat | 310 | 300 |
| Reactor | 450 | 435 |
| Residence time, sec | 2.04 | 2.32 |
| Percent $Cl_2$ recovered: | | |
| in RCl product | 33.9 | 47.7 |
| as HCl | 49.0 | 48.7 |
| Percent $C_3H_6$ recovered: | | |
| in RCl product | 62.0 | 83.0 |
| unreacted and loss | 38.0 | 17.0 |
| Duration of run, hrs | 1.5 | 2.6 |

The run in which nitrogen was used as diluent had to be discontinued at the end of 1.5 hours because the apparatus became stopped with tar. In the run in which steam was used as diluent, there was no visible evidence of tar at the end of 2.6 hours, and the over all recovery of chlorine and propylene in the chlorinated hydrocarbon product (RCl) was much higher, as shown in the table.

EXAMPLE 2

In two pairs of comparative runs, the reaction conditions were closely similar, except that in one of each pair a short reaction time of less than 1 second was employed, while in the other the reaction time was more than 1 second. The appended Table II shows the proportions of $C_3H_6$, $Cl_2$ and $H_2O$ used in each run, the preheat temperature, the reactor temperature, the residence time in the reactor, and a distillation analysis of the RCl (chlorinated hydrocarbon) product. In these runs propylene was mixed with preheated steam, and chlorine introduced into the preheated mixture, the temperature of the steam being such as to give the preheat temperature of the gas mixture as shown in the table. In one pair of runs the $Cl_2/C_3H_6$ ratio was approximately 1.5, while in the other it was approximately 1.3.

*Table II*

| Run No. | 1a | 1b | 2a | 2b |
|---|---|---|---|---|
| Gas mixture, mols: | | | | |
| $C_3H_6$ | 40 | 40.5 | 43 | 43.4 |
| $Cl_2$ | 60 | 59.5 | 57 | 56.6 |
| $H_2O$ | 76.9 | 78.7 | 82.8 | 78. |
| Ratio $Cl_2/C_3H_6$ | 1.50 | 1.47 | 1.33 | 1.30 |
| Temperature, °C.: | | | | |
| Preheat | 325 | 350 | 400 | 350 |
| Reactor | 480 | 450 | 510 | 450 |
| Residence time, sec | 0.28 | 1.66 | 0.19 | 1.65 |
| RCl product, wt. percent: | | | | |
| $C_3H_7Cl$ | 1.2 | 3.6 | 2.7 | 2.4 |
| $C_3H_5Cl$ | 17.7 | 31.8 | 30.8 | 38.2 |
| 1,2-$C_3H_6Cl_2$ | 28.5 | 7.3 | 23.0 | 5.4 |
| 1,3-$C_3H_4Cl_2$ | 7.8 | 25.1 | 14.1 | 25.9 |
| other $C_3H_4Cl_2$ | 4.4 | 8.0 | 2.8 | 8.2 |
| $C_3H_5Cl_3$ | 27.4 | 5.7 | 2.2 | 1.1 |
| $C_3H_3Cl_3$ | 2.8 | 10.2 | 7.3 | 13.1 |
| Residue | 10.4 | 7.3 | 17.1 | 5.7 |
| Mol Percent of RCl product: | | | | |
| Unsaturates | 40.8 | 80.1 | 62.9 | 88.6 |
| Saturates | 52.0 | 15.3 | 26.4 | 8.5 |
| Residue | 7.2 | 4.5 | 10.7 | 3.4 |

It will be observed from the table that in each pair of runs the saturated 1,2-dichloropropane greatly predominated over the unsaturated dichloropropenes in the reaction product where a short reaction time (0.19 or 0.28 sec.) was used, whereas the reverse is true when the reaction time is about 1.65 sec. Likewise the total yield of unsaturates is much higher in the runs with the longer reaction time.

EXAMPLE 3

A series of runs was made, under similar conditions to those in Example 2, to determine the effect of varying the $Cl_2/C_3H_6$ ratio in the feed gases. The results are shown in Table III, as follows:

*Table III*

| Run No | 1 | 2 | 3 | 4 |
|---|---|---|---|---|
| Gas mixture, mols: | | | | |
| $C_3H_6$ | 43.4 | 40.5 | 37.8 | 35.4 |
| $Cl_2$ | 56.6 | 59.5 | 62.2 | 64.6 |
| $H_2O$ | 78. | 78.7 | 74.8 | 77.5 |
| Ratio $Cl_2/C_3H_6$ | 1.30 | 1.47 | 1.64 | 1.82 |
| Temperature, ° C.: | | | | |
| Preheat | 350 | 350 | 385 | 350 |
| Reactor | 450 | 450 | 500 | 455 |
| Residence time, sec | 1.65 | 1.66 | 1.48 | 1.48 |
| RCl product, wt. percent: | | | | |
| $C_3H_7Cl$ | 2.4 | 3.6 | 2.2 | 1.8 |
| $C_3H_5Cl$ | 38.2 | 31.8 | 26.4 | 21.7 |
| 1,2-$C_3H_6Cl_2$ | 5.4 | 7.3 | 6.7 | 9.2 |
| 1,3-$C_3H_4Cl_2$ | 25.9 | 25.1 | 28.0 | 26.5 |
| other $C_3H_4Cl_2$ | 8.2 | 8.0 | 9.6 | 9.2 |
| $C_3H_5Cl_3$ | 1.1 | 5.7 | 15.1 | 6.1 |
| $C_3H_3Cl_3$ | 13.1 | 10.2 | 5.1 | 18.7 |
| Residue | 5.7 | 7.3 | 7.0 | 6.8 |
| Mol percent of RCl product: | | | | |
| Unsaturates | 88.6 | 80.1 | 75.6 | 79.9 |
| Saturates | 8.5 | 15.3 | 20.0 | 15.8 |
| Residue | 3.4 | 4.5 | 4.4 | 4.4 |

It will be noted that the sum of the di-chlorinated fractions does not vary much from run to run, nor do the individual components thereof. The principal variation of result with varying $Cl_2/C_3H_6$ ratios occurs in the mono-chlorinated and tri-chlorinated fractions. As the ratio is increased from 1.30 to 1.82, the proportion of mono-chlorinated products decreases progressively. Of the di-chlorinated derivatives, the unsaturates account for about 80 to 85 per cent of the total, and of the unsaturates about 75 per cent consists of 1,3-dichloropropene, in each of the runs. In all of the runs visible evidence of the presence of tar was absent.

EXAMPLE 4

As an example of the chlorination of allyl chloride, chlorine and allyl chloride vapors were mixed with steam in the proportion 40 mols $Cl_2$ to 60 mols $C_3H_5Cl$ to 71.6 mols $H_2O$. The steam was superheated to a degree such that the preheat temperature of the mixed gases and vapors was approximately 400° C. The preheated mixture passed at the rate of 14.6 mols per hour through a reactor in which the maximum reaction temperature was maintained at approximately 450° C., with an average residence time of 4.15 seconds. The products were condensed and the liquid condensate of chlorinated hydrocarbons had the following composition by analysis in per cent by weight:

| | |
|---|---|
| $C_3H_7Cl$ | 2.4 |
| $C_3H_5Cl$ | 34.1 |
| 1,2-$C_3H_6Cl_2$ | 3.4 |
| 1,3-$C_3H_4Cl_2$ | 32.7 |
| Other $C_3H_4Cl_2$ | 5.0 |
| $C_3H_5Cl_3$ | 9.1 |
| $C_3H_3Cl_3$ | 7.0 |
| Residue | 6.1 |

The liquid consensate was light colored and free from visible evidence of tar.

EXAMPLE 5

In similar manner to Example 4 a gas mixture was prepared in the proportions of 22.5 mols of allyl chloride, 27.5 mols of propylene, 50 mols of chlorine and 74.3 mols of water vapor. In accordance with the formula mols $Cl_2 = x$ mols $C_3H_6 + (x-1)$ mols $C_3H_5Cl$ the value of $x$ was 1.73. The mixture was preheated to a temperature of 400° C. and passed at the rate of 26.8 mols per hour through a reactor in which the maximum temperature was maintained at about 450° C. and the average residence time was 2.27 seconds. The chlorinated hydrocarbon product had the following analysis in per cent by weight:

| | |
|---|---|
| $C_3H_7Cl$ | 2.2 |
| $C_3H_5Cl$ | 41.1 |
| 1,2-$C_3H_6Cl_2$ | 5.7 |
| 1,3-$C_3H_4Cl_2$ | 28.8 |
| Other $C_3H_4Cl_2$ | 6.8 |
| $C_3H_5Cl_3$ | 3.7 |
| $C_3H_3Cl_3$ | 2.7 |
| Residue | 8.9 |

Other monochloropropene isomers, such as 1-chloropropene, or mixtures of monochloropropenes, can be chlorinated according to the invention with similar results.

I claim:

1. A process for chlorinating a material from the class consisting of propylene, monochloropropenes and mixtures thereof to produce a high yield of dichloropropenes without substantial formation of tar, which comprises forming a mixture of the material to be chlorinated, chlorine and water vapor preheated to a temperature between 100° and 400° C., in which the proportion of chlorine corresponds to the formula mols $Cl_2 = x$ mols $C_3H_6 + (x-1)$ mols $C_3H_5Cl$ wherein $x$ has a value between 1.3 and 1.9, and in which the proportion of water vapor is sufficient to control the temperature of the ensuing reaction within the stated limits, and immediately passing the preheated mixture through a reaction zone maintained at a maximum temperature between 400° and 550° C. with a flow rate such as to provide an average residence time in the reaction zone of at least one second.

2. A process for chlorinating propylene to produce a high yield of dichloropropenes without substantial formation of tar which comprises forming a mixture of propylene, chlorine and water vapor preheated to a temperature between 100° and 400° C., in which the molar ratio of $Cl_2$ to $C_3H_6$ is between 1.3 and 1.9 and the proportion of water vapor is sufficient for temperature control of the ensuing reaction between the stated limits, and immediately passing the preheated mixture through a reaction zone maintained at a maximum temperature between 400° and 550° C. with a flow rate such as to provide an average residence time in the reaction zone of at least one second.

3. A process for chlorinating monochloropropenes to produce a high yield of dichloropropenes without substantial formation of tar which comprises forming a mixture of monochloropropenes, chlorine and water vapor preheated to a temperature between 100° and 400° C., in which the molar ratio of $Cl_2$ to $C_3H_5Cl$ is between 0.3 and 0.9 and the proportion of water vapor is sufficient for temperature control of the ensuing reaction between the stated limits, and immediately passing the preheated mixture through a reaction zone maintained at a maximum temperature between 400° and 550° C. with a flow rate such that the average residence time of the gases in the reaction zone is at least one second.

4. A process for chlorinating a mixture of propylene and monochloropropenes to produce a high yield of dichloropropenes without substantial formation of tar which comprises forming a mixture of propylene, monochloropropenes, chlorine and water vapor preheated to a temperature between 100° and 400° C., in which the molar ratio of $Cl_2$ to propylene and monochloropropenes corresponds to the formula mols $Cl_2 = x$ mols $C_3H_6 + (x-1)$ mols $C_3H_5Cl$ wherein $x$ has a value between 1.3 and 1.9, and in which the proportion of water vapor is sufficient for temperature control of the ensuing reaction between the stated limits, and immediately passing the preheated mixture through a reaction zone maintained at a maximum temperature between 400° and 550° C. with a flow rate such that the average residence time of the gases in the reaction zone is at least one second.

References Cited in the file of this patent

UNITED STATES PATENTS

| Number | Name | Date |
|---|---|---|
| 2,130,084 | Groll et al. | Sept. 13, 1938 |
| 2,278,527 | Rust et al. | Apr. 7, 1942 |
| 2,379,414 | Cass | July 3, 1945 |
| 2,430,326 | Cheney et al. | Nov. 7, 1947 |

FOREIGN PATENTS

| Number | Country | Date |
|---|---|---|
| 468,016 | Great Britain | June 28, 1937 |
| 502,611 | Great Britain | Mar. 21, 1939 |